United States Patent [19]

Fussgänger

[11] Patent Number: 5,202,780
[45] Date of Patent: Apr. 13, 1993

[54] OPTICAL COMMUNICATION SYSTEM FOR THE SUBSCRIBER AREA

[75] Inventor: Kurt Fussgänger, Remseck, Fed. Rep. of Germany

[73] Assignee: Alcatel N.V., Amsterdam, Netherlands

[21] Appl. No.: 510,608

[22] Filed: Apr. 17, 1990

[30] Foreign Application Priority Data

Apr. 22, 1989 [DE] Fed. Rep. of Germany ....... 3913300

[51] Int. Cl.$^5$ .............................................. H04J 14/02
[52] U.S. Cl. ..................................... 359/125; 359/133
[58] Field of Search .................... 370/3; 359/124, 125, 359/133, 114, 118

[56] References Cited

FOREIGN PATENT DOCUMENTS 3220817 12/1982 Fed. Rep. of Germany .......... 370/3
3632047 4/1988 Fed. Rep. of Germany .

OTHER PUBLICATIONS

A paper from the IEEE Proceedings Global Telecommunications Conference, entitled "A Passive Photonic Loop Architecture Employing Wavelength-Division Multiplexing".

"Services Integration and Multiplexing for Broad-Band Communication Systems", A. M. Ali and K. W. Fussganger, *IEEE Journal on Selected Areas in Communications*, vol. SAC-4, No. 4, Jul. 1986, pp. 551-564.

"Experimental Demonstration of a Passive Optical Subscriber Loop Architecture", S. S. Wagner et al, *Electronics Letters*, Mar. 17, 1988, vol. 24, No. 6, pp. 344-346.

Miki, T., Asatani, K., and Okano, Y., "A Design Concept on Fiber-Optic Wavelength-Division-Multiplexing Subscriber Loop System," HTG-Fachber (Germany), vol. 73, 1980.

Wong, C. L. and Patel, S. C., "Design Considerations in Fiber-optic Distribution Systems," HTG Fechber, vol. 73, pp. 125-131, 1980.

*Primary Examiner*—Edward L. Coles, Sr.
*Assistant Examiner*—Kinfe-Michael Negash
*Attorney, Agent, or Firm*—Ware, Fressola, Van Der Sluys & Adolphson

[57] ABSTRACT

A group of subscribers serviced from a center has a common remote distribution unit located in its vicinity. The subscribers are connected to this remote distribution unit by individual lines, preferably optical waveguides. A single optical waveguide connects the center to the remote distribution unit. Subscriber-assigned signals with subscriber-assigned wavelengths and signals to be distributed to all subscribers in the direction from the center to the subscribers are transmitted as a multiplexed optical signal, using wavelength-division multiplexing, to the remote distribution unit. The optical signal containing the signals to be distributed is separated out at the remote distribution unit and is distributed by optical means to the subscribers. The subscriber-assigned signals are also separated in the remote distribution unit into individual signals and are transmitted to the subscribers over individual lines. In the opposite direction from the subscribers to the center, the signals to be transmitted from the subscribers to the center are also transmitted over the individual lines with subscriber-assigned wavelength to the remote distribution unit where they are grouped into an optical multiplexed signal and are transmitted to the center over an optical waveguide. A suitable selection of the wavelengths makes possible a simple multiplexed formation and multiplexed resolution of the various signals.

20 Claims, 2 Drawing Sheets

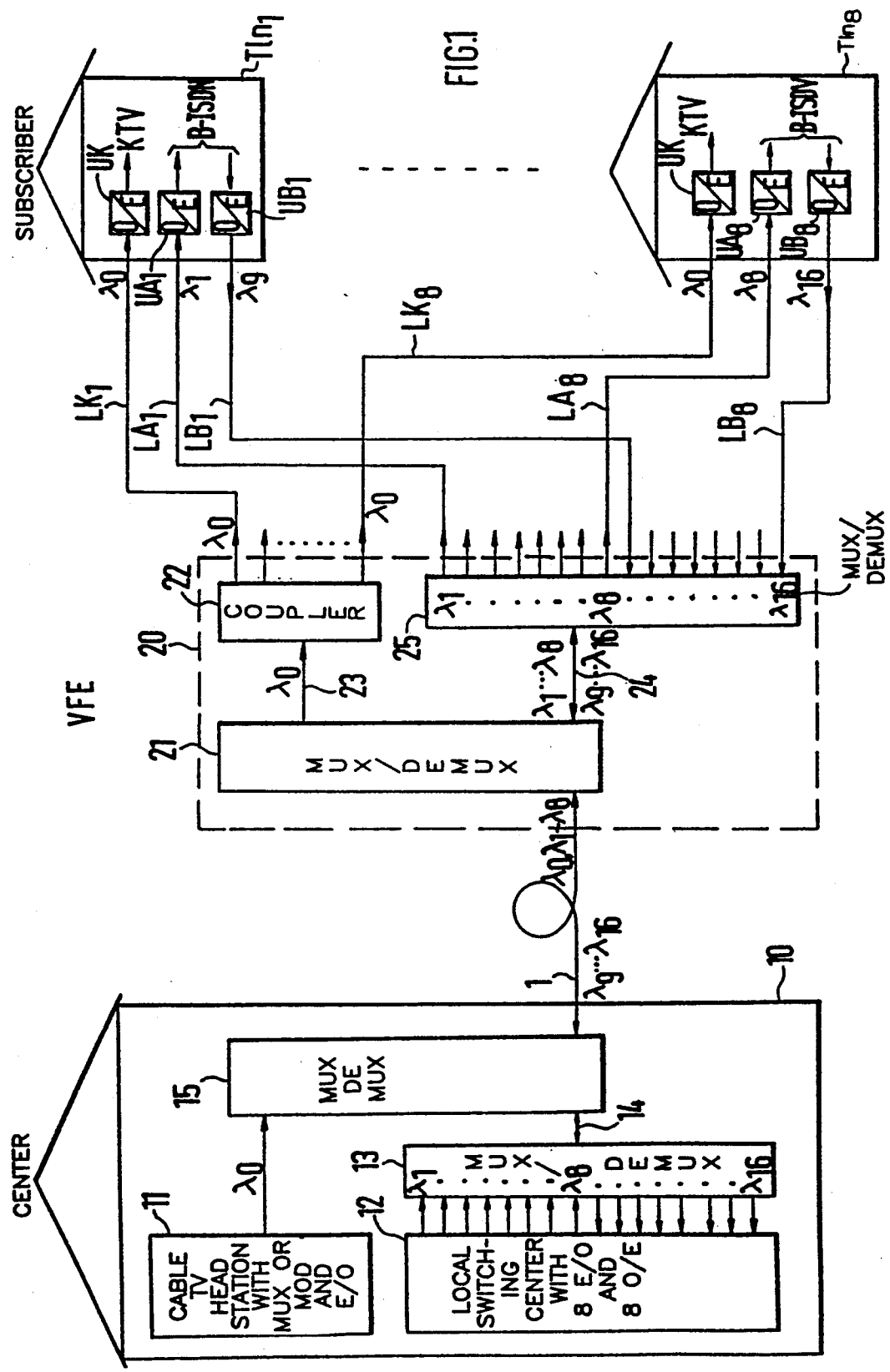

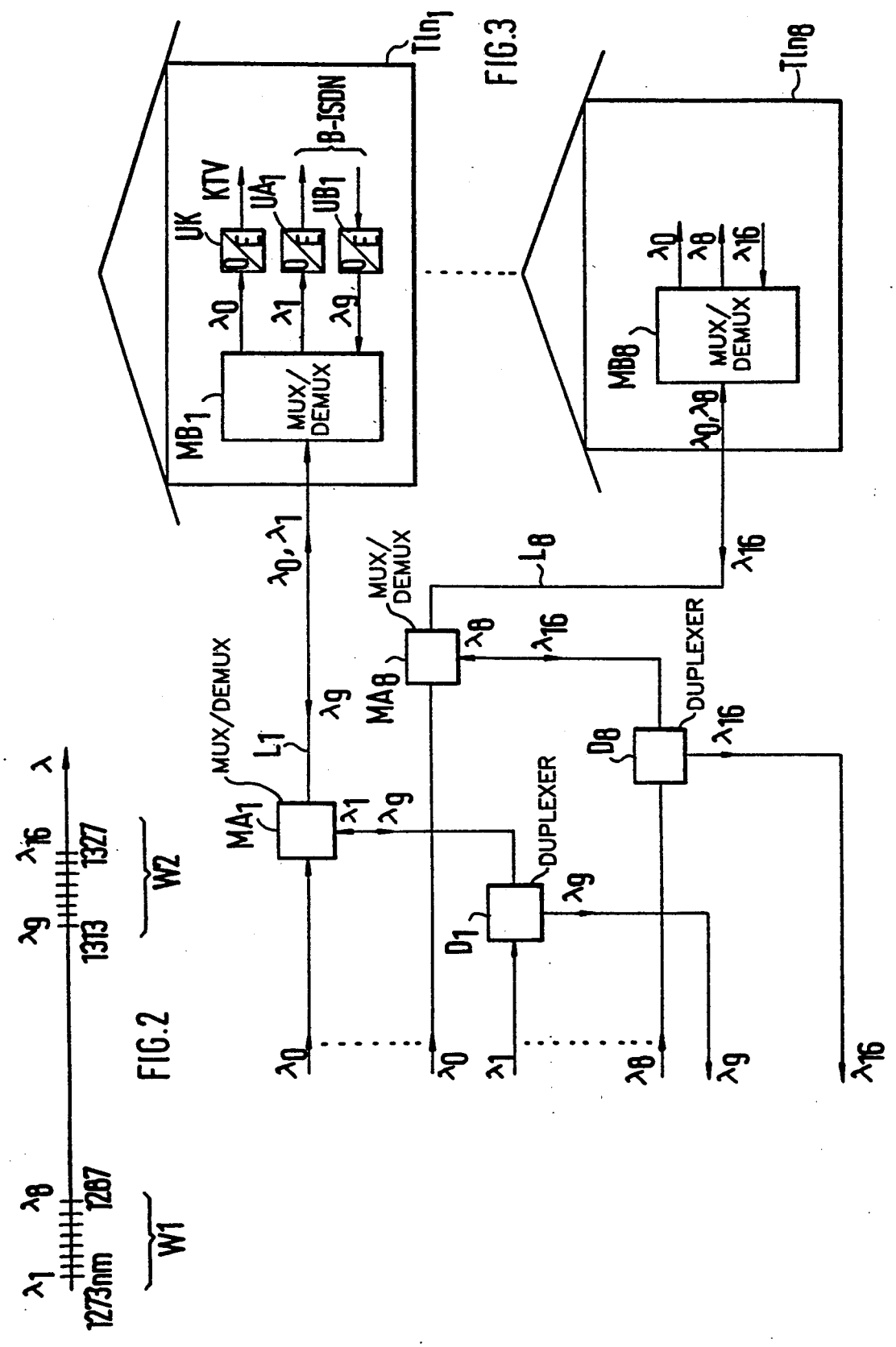

OPTICAL COMMUNICATION SYSTEM FOR THE SUBSCRIBER AREA

BACKGROUND OF THE INVENTION

1. Field of the Invention

The invention relates to an optical communication system for transmitting subscriber-assigned information signals in two directions between a center and a plurality of subscribers.

2. Description of the Prior Art

A communication system of this type is known from EP-A2-0 164 652. A distribution of information signals, e.g., television signals, from the center to the subscribers is not provided in this. Only bidirectional information services, also called interactive services, are to be handled by the system.

It would be desirable to have a solution in which not only bidirectional but also unidirectional services, i.e., distribution services, can be handled. For this, the following solutions are known:

a) EP-B1-0 071 232 provides the teaching of using two optical waveguides for each subscriber: One for television and radio transmission, i.e., for the distribution services, and the other for the bidirectional information services. This does not involve an integrated system, but two systems independent of each other, and there is the disadvantage that large lengths of optical waveguides are required altogether.

b) From "IEEE Journal on Selected Areas in Communications", Vol. SAC-4, No. 4, July 1986, pp. 551–564, it is known (p. 554) to expand a system of the type mentioned above (FIG. 5 on p. 554) into a service-integrated system for interactive and distribution services by the fact that the signals for the transmission of television and radio programs are added by time-division multiplexing to the signals to be transmitted by the center to the subscribers for the interactive services, and that the bit sequence frequency for this transmission direction is thereby increased. This type of integration appears meaningful from economic viewpoints, but may be undesirable for political or legal reasons if the distribution services and the interactive services are assigned to different operators.

A purely optical distribution system which, like the interactive system mentioned at the beginning, contains a passive optical remote distribution unit is known from DE-OS 32 20 817.

Aside from the above-mentioned integration of the distribution services into a system for handling the interactive services by time-division multiplexing and by increasing the bit sequence frequency, no proposal is known for how an optical transmission system can be created for the subscriber area with which both the distribution services and the interactive services can be handled.

SUMMARY OF THE INVENTION

It is the task of the invention to provide such a system wherein a group of subscribers has a common remote distribution unit located in its vicinity. The subscribers are connected to this remote distribution unit by separate subscriber-assigned lines which are preferably optical waveguides.

A single optical waveguide runs between the center and the remote distribution unit. In the direction from the center to the subscribers, the subscriber-assigned signals with subscriber-assigned wavelengths and the signals to be distributed at another wavelength are all transmitted as a multiplexed optical signal using wavelength-division multiplexing. The optical signal containing the signals to be distributed is separated out at the remote distribution unit, and the separated signals are distributed by optical means to the subscribers. The subscriber-assigned signals are also separated in the remote distribution unit into individual signals and are transmitted to the subscribers over subscriber-assigned lines, particularly optical waveguides.

In the opposite direction, the signals to be transmitted from the subscribers to the center are also transmitted over subscriber-assigned lines with subscriber-assigned wavelengths to the remote distribution unit, where they are grouped into an optical multiplexed signal and are transmitted to the center over the optical waveguide.

A suitable selection of the wavelengths makes possible a simple multiplexed formation and multiplexed resolution of the various signals.

DESCRIPTION OF THE DRAWINGS

The invention will now be explained in greater detail by examples, with reference to the drawings, in which:

FIG. 1 shows the basic structure of the system according to the invention,

FIG. 2 shows an example of the location of the subscriber-assigned wavelengths to be used, and FIG. 3 shows a modification of the system according to FIG. 1 with respect to the transmission between the remote distribution unit and the subscribers.

DETAILED DESCRIPTION OF THE PREFERRED EMBODIMENT

In FIG. 1, the left-hand part shows the devices present in the center, the right-hand part shows a group of subscribers $Tln_1$ to $Tln_8$, and the central part shows a remote distribution unit, abbreviated as VFE. This basic configuration has in common with the known system mentioned above the fact that the subscribers are connected to the remote distribution unit by individual lines and the remote distribution unit is connected to the center by a single optical waveguide.

Star couplers or remote distribution units are located in the vicinity of a group of subscribers, which can also mean that they are located, for example, in the cellar of a multi-family house if the group of subscribers lives in a multi-family house. The latter applies preferably for active remote distribution units.

The center has the reference number 10. It contains a so-called cable television head station 11, which delivers an optical signal with a wavelength $\lambda_0$ at its output. This optical signal contains all of the television and radio programs to be distributed to the subscribers, i.e., the cable television head station also includes the devices that are necessary to convert the electrical television and radio signals into a time or frequency multiplexed signal containing the signals and to convert this to an optical signal with the wavelength $\lambda_0$, i.e., multiplexers or modulators and an electrical-optical transducer. In this case, it does not matter whether the signals are transmitted as digital signals or as analog signals.

The center 10 also includes a local switching center 12, which delivers the signals to be transmitted to subscribers at its outputs and receives the signals received from the subscribers at its inputs. These signals are multiplexed signals for subscribers using several telecommunications services, and the local switching center also contains devices (E/O) for converting the electrical multiplexed signals to be transmitted to the subscribers to optical signals, and devices (O/E) for converting the optical signals received from the subscribers to electrical signals.

In the example, it is shown that the local switching center delivers eight optical signals with wavelengths $\lambda_1$ to $\lambda_8$ for eight subscribers at its outputs and receives a total of eight optical signals with wavelengths $\lambda_9$ to $\lambda_{16}$ from these eight subscribers. The local switching center thus contains eight electrical-optical transducers and eight optical-electrical transducers for the subscribers Tln$_1$ to Tln$_8$.

It also always contains such devices for other groups of subscribers. In the exemplifying embodiment, however, only the one group of subscribers and the devices present for these will be considered.

As will be explained later, the subscriber-assigned signals to be transmitted to a group of subscribers are thus transmitted from the local switching center 12 to the subscribers as optical signals with subscriber-assigned wavelengths. As will also be explained later, the subscriber-assigned signals to be transmitted from the group of subscribers to the center are also transmitted as optical signals with subscriber-assigned wavelengths. The bidirectional communication services, also called interactive services, e.g., telephony, data transmission, and video telephony are handled in this manner. Since a large bandwidth is available for transmission, the system is also suitable for the bidirectional telecommunications services of the planned telecommunication network B-ISDN (Broadband-Integrated Services Digital Network) or the "Integrated Broadband Telecommunication Network" (IBFN).

In contrast to the subscriber-assigned wavelengths $\lambda_1$ through $\lambda_{16}$, the wavelength $\lambda_0$ is common to all subscribers, because all subscribers are to receive the same optical signal, i.e., the same television and radio signals.

To simplify the description, the direction of transmission from the center to the subscribers will be referred to as the downward direction and the direction of transmission from the subscribers to the center as the upward direction for all signals in the following discussion.

The transmission in the downward direction takes place as follows: An optical multiplexer-demultiplexer 13 groups the signals to be transmitted in the downward direction, with the subscriber-assigned wavelengths $\lambda_1$ to $\lambda_8$, into an optical multiplexed signal and couples this onto a single optical waveguide 14, which is connected to another optical multiplexer-demultiplexer 15. The same optical waveguide 14 transmits from the multiplexer-demultiplexer 15, in the upward direction, an optical multiplexed signal, consisting of optical signals with the subscriber-assigned wavelengths $\lambda_9$ to $\lambda_{16}$, which the multiplexer-demultiplexer separates into the individual signals and passes each of these individual signals, as shown, onto an optical waveguide, through which it reaches the inputs of the local switching center 12. The multiplexer-demultiplexer 13 is a known grid type multiplexer-demultiplexer for 16 wavelengths.

The multiplexer-demultiplexer 15 groups the optical signal received from the head station 11 with the wavelength $\lambda_0$ together with the optical multiplexed signal received from the optical waveguide 14, containing the signals with the wavelengths $\lambda_1$ to $\lambda_8$ and passes it for transmission in the downward direction onto the optical waveguide 1 connecting the center with the remote distribution unit. In the upward direction, it allows the mixture of optical signals with the wavelengths $\lambda_9$ to $\lambda_{16}$ received from the remote distribution unit to reach the optical waveguide 14 for further transmission.

The remote distribution unit, designated with the reference number 20, contains an optical multiplexer-demultiplexer 21, which separates out the signal with the wavelength $\lambda_0$ from the optical multiplex signal received from the center and passes it onto an optical waveguide 23 leading to an optical distributing unit 22. It passes the optical signal with the wavelengths $\lambda_1$ to $\lambda_8$ onto an optical waveguide 24, which transmits them to a multiplexer-demultiplexer 25. This multiplexer-demultiplexer 25 separates the optical multiplexed signal transmitted in the downward direction into its individual signals with the wavelengths $\lambda_1$ to $\lambda_8$ and outputs these at separate outputs, and it groups the optical signals with subscriber-assigned wavelengths $\lambda_9$ to $\lambda_{16}$ that are to be transmitted in the upward direction into a wavelength-division multiplexed signal, which it passes to the optical waveguide 24 that transmits it to the multiplexer-demultiplexer 21.

The optical signal with the wavelength $\lambda_0$ that is to be distributed is distributed by the optical distributing unit, in the simplest case a star coupler, over eight outputs and, from each output, an optical waveguide LK$_1$ to LK$_8$ leads to one of the subscribers Tln$_1$ to Tln$_8$. Each subscriber contains an optical-electrical transducer UK, which converts the received optical signal with the wavelength $\lambda_0$ to the standard electrical cable television signal. Each of the signals to be transmitted in the downward direction from the remote distribution unit to the subscribers, with the subscriber-assigned wavelengths $\lambda_1$ to $\lambda_8$, is transmitted by the corresponding output of the multiplexer-demultiplexer 25 through a subscriber-assigned optical waveguide LA$_1$ to LA$_8$ to the corresponding subscriber and is there converted by an optical-electrical transducer UA$_1$ to UA$_8$ to an electrical multiplexed signal assigned to the particular subscriber, e.g., the signal to be transmitted in the downward direction to the subscribers in the integrated network B-ISDN.

For the transmission in the upward direction, each subscriber contains an electrical-optical transducer (UB$_1$ to UB$_8$). These transducers convert the electrical signal to be transmitted from the particular subscriber to the center, for the handling of the bidirectional services, into an optical signal with a subscriber-assigned wavelength, and a separate optical waveguide leads from each subscriber to the remote distribution unit 20. The subscriber-assigned wavelengths are designated by $\lambda_9$ to $\lambda_{16}$ and the subscriber-assigned optical waveguides for the upward direction are designated by LB$_1$ to LB$_8$.

The multiplexer-demultiplexers mentioned above are known in themselves, with respect to their function and their realization, so that, after the explanation of the function that has been presented, an explanation of the realization is unnecessary.

Two exemplifying embodiments for the wavelengths to be used are presented below in Table 1 and Table 2.

In one, the wavelength $\lambda_0$ is located at 1500 nm and the wavelengths $\lambda_1$ to $\lambda_{16}$ are centered at 1300 nm, and in the other the situation is the reverse.

TABLE 1

| |
|---|
| $\lambda_0$ = 1500 or 1550 nm |
| $\lambda_1$ = 1273 nm |
| $\lambda_2$ = 1275 nm |

TABLE 1-continued $\lambda_3 = 1277$ nm
$\lambda_4 = 1279$ nm
$\lambda_5 = 1281$ nm
$\lambda_6 = 1283$ nm
$\lambda_7 = 1285$ nm
$\lambda_8 = 1287$ nm
$\lambda_9 = 1313$ nm
$\lambda_{10} = 1315$ nm
$\lambda_{11} = 1317$ nm
$\lambda_{12} = 1319$ nm
$\lambda_{13} = 1321$ nm
$\lambda_{14} = 1323$ nm
$\lambda_{15} = 1325$ nm
$\lambda_{16} = 1327$ nm

TABLE 2

$\lambda_0 = 1300$ nm
$\lambda_1 = 1501$ nm
$\lambda_2 = 1503$ nm
$\lambda_3 = 1505$ nm
$\lambda_4 = 1507$ nm
$\lambda_5 = 1509$ nm
$\lambda_6 = 1511$ nm
$\lambda_7 = 1513$ nm
$\lambda_8 = 1515$ nm
$\lambda_9 = 1541$ nm
$\lambda_{10} = 1543$ nm
$\lambda_{11} = 1545$ nm
$\lambda_{12} = 1547$ nm
$\lambda_{13} = 1549$ nm
$\lambda_{14} = 1551$ nm
$\lambda_{15} = 1553$ nm
$\lambda_{16} = 1555$ nm The location of the wavelengths $\lambda_1$ to $\lambda_{16}$ according to the exemplifying embodiment according to Table 1 is represented graphically in FIG. 2. Here it becomes clearly visible that the wavelengths $\lambda_1$ to $\lambda_8$ to be used for transmission in the downward direction are located with a small spacing from each other (only 2 nm) in a first wavelength band W1 and the subscriber-assigned wavelengths $\lambda_9$ to $\lambda_{16}$, which are to be used for the upward direction, are located in a second wavelength band W2 and also are separated by a small distance. The distance can generally be selected as 1-5 nm. In the case of coherent transmission, it can even be much smaller, namely by a factor of the approximate order of magnitude of 1,000. Between the two bands there is a predetermined, distinct distance of 26 nm, generally 20-80 nm. The total wavelength range from $\lambda_1$ to $\lambda_{16}$ is, in turn, distinctly separated from the wavelength $\lambda_0$ (1500 nm) (not shown in FIG. 2). These properties are also shown by the exemplifying embodiment according to Table 2.

The exemplifying embodiments are based on the principle of distinctly separating the wavelength band in which the wavelength $\lambda_0$ for the distribution purposes is located (by a distance of approximately 200 nm) from the wavelength band from which the subscriber-assigned wavelengths are selected, to place these subscriber-assigned wavelengths, separated according to the downward and upward direction, into two bands (W1, W2), between which there is also a distinct separation (26 nm), and to let the wavelengths in the individual bands follow very closely upon each other.

In this way, the following advantages are achieved:

1. By means of simple multiplexers and demultiplexers, the optical signal for the distribution services can be added to the signals for the interactive services and can be separated from these.

2. For all subscribers, the subscriber-assigned wavelengths selected for the two transmission directions that are assigned to a subscriber, e.g., $\lambda_1$ and $\lambda_9$ or $\lambda_8$ and $\lambda_{16}$, are in bands separated from each other by a uniform distance, namely 40 nm. As a result, if a multiplexing or demultiplexing of the two wavelengths assigned to a subscriber is provided, uniform multiplexer-demultiplexers, particularly, for example, dichroic cut-off filters or wavelength-selective fiber-fusion couplers, can be used for all subscribers. Multiplexers and demultiplexers of this type are also shown in the exemplifying embodiment according to FIG. 3.

The selection of the wavelengths according to the invention explained above is new with respect to the state of the art, even if only the subscriber-assigned wavelengths are considered. In the initially-mentioned known system, the wavelengths used for one transmission direction (e.g., those with the odd-numbered indices) are separated from each other by large distances and the wavelengths used for the opposite direction are located between them. Overall, a range of 1170 to 1610 nm is used, so that the known arrangement does not provide any possibility for adding an additional wavelength for the distribution services in a suitable manner.

The multiplexing and demultiplexing of optical signals whose wavelengths are very close together, namely with a separation of only 2 nm, is known in itself from "Electronics Letters", Vol. 24, No. 6, Mar. 17, 1988, pp. 344-346. The wavelengths for the two transmission directions in that case are not in two adjacent regions.

Some modifications and further developments of the invention are explained below.

To make certain that no subscriber can receive a portion of a signal intended for another subscriber, optical narrowband filters can be inserted in the remote distribution unit, into the optical waveguides leading to the subscribers, or in the center, into the optical waveguides leading to the local switching center.

If the remote distribution unit is too far removed from the subscribers, it is possible that the level of the optical signal received by the subscribers is too low. In that case, the remote distribution unit can contain optical amplifiers for each optical signal to be transmitted to a subscriber, or the optical signals can be converted to electrical signals, electrically amplified, and converted back to optical signals. The remote distribution unit in these cases thus changes from a purely passive optical device to an active device. The remote distribution unit can, however, also be kept passive if fiber amplifiers are used as optical amplifiers, whose pump light is transmitted from each particular transcriber to the remote distribution unit.

A modification in which electrical conductors, e.g., coaxial lines instead of optical waveguides lead to the subscribers and in which the remote distribution unit contains optical-electrical transducers and electrical-optical transducers is also part of the invention.

Finally, it is also possible to reduce the number of optical waveguides conducted to a subscriber through the use of additional wavelength-division multiplexers and demultiplexers.

An example of this is shown in FIG. 3. For the subscriber Tln$_1$, the remote distribution unit contains a wavelength-division duplexer D$_1$, which passes the optical signal with the wavelength $\lambda_1$ that is to be transmitted to the subscriber Tln$_1$ to the output connected with a wavelength-division multiplexer/demultiplexer MA₁ and which passes an optical signal with the wavelength $\lambda_9$ received from MA₁ to an input of the multiplexer-demultiplexer 25 shown in FIG. 1, for further transmission in the upward direction. The multiplexer-demultiplexer MA₁ adds to the optical signal with the wavelength $\lambda_1$, which is to be transmitted to the subscriber Tln₁, the optical signal with the wavelength $\lambda_0$ to be transmitted to this subscriber and, in the downward direction, passes the optical signal with the wavelength $\lambda_9$ received from this subscriber to its output connected with D₁. The remote distribution unit is thus connected with the subscriber Tln₁ through a single optical waveguide L₁, over which the signals with the wavelengths $\lambda_0$ and $\lambda_1$ are transmitted in the downward direction and the signal with the wavelength $\lambda_9$ in the upward direction. The subscriber has a multiplexer-demultiplexer MB₁, which separates $\lambda_0$ from $\lambda_1$ in the downward direction and passes the signal with the wavelength $\lambda_9$ to the optical waveguide L₁ in the upward direction. As in FIG. 1, the subscriber has optical-electrical transducers UA₁ and UK for $\lambda_1$ and $\lambda_0$, respectively, and an electrical-optical transducer UB₁.

Instead of D1 and MA1, one can also use a single wavelength-division multiplexer/demultiplexer device for handling three wavelengths which has the function of both and, in its function, corresponds to the multiplexer-demultiplexer MB₁ with reverse direction.

Corresponding multiplexer-demultiplexers are present in the remote distribution unit for the other subscribers and also in these themselves. For the subscriber Tln₈, they are shown and are designated accordingly, only with the other index. As already mentioned above in connection with the explanation of the selection of wavelengths, uniform multiplexer-demultiplexers can be used for the subscribers and in the subscribers, despite the individual wavelengths.

Whether, as shown in FIG. 1, several optical waveguides per subscriber or, as shown in FIG. 3, one optical waveguide per subscriber and associated multiplexer-demultiplexers are used depends on the costs of the multiplexer-demultiplexers in relation to the costs of the optical waveguides. It is also possible to provide a separate optical waveguide per subscriber for the distribution service, i.e., the optical signal with the wavelength $\lambda_0$, and to transmit the optical signals for the interactive services in the upward and downward direction in the wavelength-division duplexer by means of a second optical waveguide present for each subscriber.

For each of the variants described, the system according to the invention has the advantage that the distribution and interactive services are separated from each other electrically and are linked to each other only optically, and in such a way that the linkage can be effected and released by simple optical means. In this manner, it is possible to introduce the transmission devices for the distribution services and the transmission devices for the interactive services independently of each other, so that the dissemination and acceptance of the different services, e.g., in a future integrated broadband telecommunication network (IBFN) can develop differently.

What is claimed is:

1. An optical communication system for transmitting subscriber-assigned information signals in two directions between a center and a plurality of subscribers.
   wherein for each of a plurality of groups of subscribers, a remote distribution unit is provided in the vicinity of said group of subscribers,
   wherein the subscriber-assigned information signals to be transmitted from the center to said group of subscribers are first transmitted to the remote distribution unit over a single optical waveguide using wavelength-division multiplexing with subscriber-assigned wavelengths,
   wherein in the remote distribution unit, a wavelength-division multiplexed signal received from the center is separated by optical means into individual optical signals having the subscriber-assigned wavelength,
   wherein said optical signals are transmitted from the remote distribution unit in individual optical signals having the subscriber-assigned wavelengths,
   wherein said optical signals are transmitted from the remote distribution unit to the subscribers over individual lines, and
   wherein the subscriber-assigned information signals to be transmitted from said group of subscribers to the center are transmitted from the subscribers to the remote distribution unit over the individual lines, and thence to the center over the same optical waveguide using the wavelength-division multiplexing with subscriber-assigned wavelengths,
   characterized in
   that, using an additional wavelength which is common to all subscribers, a composite signal containing signals to be distributed from the center to the subscribers is transmitted over the same optical waveguide from the center to the remote distribution unit, where it is separated from the wavelength-division multiplexed signal and distributed, by optical means and over individual lines to the subscribers of said group,
   that a wavelength band containing the subscriber-assigned wavelengths is clearly separated from a wavelength band containing the additional wavelength,
   that the subscriber-assigned wavelengths used for transmission from the center to the subscribers lie in a first wavelength band, and the subscriber-assigned wavelengths used for transmission from the subscribers to the center line in a second wavelength band, said first and second wavelength bands being separated by a predetermined distance, and
   that in each of the two wavelength bands, adjacent wavelengths are separated by a short distance.

2. A system as claimed in claim 1, characterized in that the two wavelength bands containing the subscriber-assigned wavelengths are centered about approximately 1300 nm, and that the band containing the additional wavelength is centered about approximately 1500 nm.

3. A system as claimed in claim 1, characterized in that in each of the wavelength bands containing the subscriber-assigned wavelengths, adjacent wavelengths are separated by only 1 to 5 nm, and that the two wavelength bands are separated by 20 to 80 nm.

4. A system as claimed in claim 1 characterized in that the individual lines are three optical waveguides per subscriber.

5. A system as claimed in claim 1, characterized in that the individual lines are electric lines.

6. A system as claimed in claim 1, characterized in that the individual lines are a single optical waveguide per subscriber and that in the remote distribution unit and at the subscribers, optical multiplexer-demultiplexers are provided which permit the different optical signals to be transmitted between the remote distribution unit and the subscribers over the single optical waveguide per subscriber using wavelength-division multiplexing.

7. A system as claimed in claim 1, characterized in that the individual lines are two optical waveguides per subscriber, that the optical signal containing the signals to be distributed to the subscribers, which has the additional wavelength, is transmitted over one of said two optical waveguide, and that in the remote distribution unit and at the subscribers, optical duplexers are provided which permit duplex transmission of the different optical signals between the remote distribution unit and the subscriber over the other of said two optical waveguides.

8. A system as claimed in claim 1, characterized in that the two wavelength bands containing the subscriber-assigned wavelengths are centered about approximately 1500 nm, and that the band containing the addition wavelength is centered about approximately 1300 nm.

9. A system as claimed in claim 2, characterized in that the individual lines are three optical waveguides per subscriber.

10. A system as claimed in claim 3, characterized in that the individual lines are three optical waveguides per subscriber.

11. A system as claimed in claim 8, characterized in that the individual lines are three optical waveguides per subscriber.

12. A system as claimed in claim 2, characterized in that the individual lines are electric lines.

13. A system as claimed in claim 3, characterized in that the individual lines are electric lines.

14. A system as claimed in claim 8, characterized in that the individual lines are electric lines.

15. A system as claimed in claim 2, characterized in that the individual lines are a single optical waveguide per subscriber, and that in the remote distribution unit and at the subscribers, optical multiplexer-demultiplexers are provided which permit the different optical signals to be transmitted between the remote distribution unit and the subscribers over the single optical waveguide per subscriber using wavelength-division multiplexing.

16. A system as claimed in claim 3, characterized in that the individual lines are a single optical waveguide per subscriber, and that in the remote distribution unit and at the subscribers, optical multiplexer-demultiplexers are provided which permit the different optical signals to be transmitted between the remote distribution unit and the subscribers over the single optical waveguide per subscriber using wavelength-division multiplexing.

17. A system as claimed in claim 8, characterized in that the individual lines are a single optical waveguide per subscriber, and that in the remote distribution unit and at the subscribers, optical multiplexer-demultiplexers are provided which permit the different optical signals to be transmitted between the remote distribution unit and the subscribers over the single optical waveguide per subscriber using wavelength-division multiplexing.

18. A system as claimed in claim 2, characterized in that the individual lines are two optical waveguides per subscriber, that the optical signal containing the signals to be distributed to the subscribers, which has the additional wavelength, is transmitted over one of said two optical waveguides, and that in the remote distribution unit and at the subscribers, optical duplexers are provided which permit duplex transmission of the different optical signals between the remote distribution unit and the subscriber over the other of said two optical waveguides.

19. A system as claimed in claim 3, characterized in that the individual lines are two optical waveguides per subscribers, that the optical signal containing the signals to be distributed to the subscribers, which has the additional wavelength, is transmitted over one of said two optical waveguides, and that in the remote distribution unit and at the subscribers, optical duplexers are provided with permit duplex transmission of the different optical signals between the remote distribution unit and the subscriber over the other of said two optical waveguides.

20. A system as claimed in claim 8, characterized in that the individual lines are two optical waveguides per subscriber, that the optical signal containing the signals to be distributed to the subscribers, which has the additional wavelength, is transmitted over one of said two optical waveguides, and that in the remote distribution unit and at the subscribers, optical duplexers are provided which permit duplex transmission of the different optical signals between the remote distribution unit and the subscriber over the other of said two optical waveguides.

* * * * *